United States Patent [19]

Gordon

[11] Patent Number: 5,011,261
[45] Date of Patent: Apr. 30, 1991

[54] COLOR PAGE SCANNER USING FIBER OPTIC BUNDLE AND A PHOTOSENSOR ARRAY

[75] Inventor: Eugene I. Gordon, Summit, N.J.
[73] Assignee: Photon Imaging Corp., Edison, N.J.
[21] Appl. No.: 339,602
[22] Filed: Apr. 17, 1989
[51] Int. Cl.$^5$ ............... G02B 6/00; G02B 6/06; H04N 1/46
[52] U.S. Cl. ............... 350/96.25; 350/96.10; 358/75; 358/901
[58] Field of Search ............ 350/96.24, 96.25, 96.26, 350/96.27; 250/227; 358/75, 901; 355/1

[56] References Cited

U.S. PATENT DOCUMENTS

| | | | |
|---|---|---|---|
| 2,757,302 | 7/1956 | Hughes | 358/901 X |
| 4,413,276 | 11/1983 | Hertz et al. | 358/75 |
| 4,570,063 | 2/1986 | De Bie et al. | 250/227 |
| 4,674,834 | 6/1987 | Margolin | 350/96.24 |
| 4,702,552 | 10/1987 | Margolin | 350/96.24 |
| 4,762,391 | 8/1988 | Margolin | 350/96.24 X |
| 4,827,335 | 5/1989 | Saito et al. | 358/75 |

*Primary Examiner*—Akm Ullah
*Attorney, Agent, or Firm*—Herbert M. Shapiro

[57] ABSTRACT

A color image scanner comprises a noncoherent fiber optic bundle having a linear entrance face and an area exit face coupled to an array of photosensors. The density of sensors of the array is such that each fiber end in the exit face corresponds to a plurality of sensors. A striped (RGB) color filter positioned between the exit face and the sensor array permits a sensor to be selected for each color for each pixel in the entrance face. The addresses of the three sensors for each pixel are stored in a lookup table in a proper sequence to correspond to the proper pixel sequence in the entrance face. The addresses are stored in sequence in ROM and the sequence is triggered for each of the consecutive scan lines of a page being scanned. Thus, color scanner operation is achieved with a monochrome photosensor array in the absence of time-sequential color illumination.

18 Claims, 3 Drawing Sheets

COLOR PAGE SCANNER USING FIBER OPTIC BUNDLE AND A PHOTOSENSOR ARRAY

FIELD OF THE INVENTION

This invention relates to image scanners and more particularly to such scanners which employ a plurality of light pipes such as a fiber optic bundle and an array of photosensors.

BACKGROUND OF THE INVENTION

U.S. Pat. No. 4,674,834 issued June 23, 1987 and now assigned to the assignee of the present application discloses a page scanner using a noncoherent bundle of optical fibers extending from a linear entrance face to an area exit face. The pixels in the area face are imaged onto an array of photosensors. The fiber ends in the area face are random with respect to the positions of the fiber ends in the linear face. Accordingly, the bundle is "noncoherent" and the pixels exiting the area face are scrambled.

An initialization procedure is employed to unscramble the pixels electronically. The procedure is operative to move a light slit, narrower than a fiber end, along the linear face of the bundle and interrogating the sensor array to determine the addresses of sensors illuminated for each position of the slit. A computer program is operative to select a single address in each instance and to place those addresses in a sequence which corresponds to the sequence of slit positions. Thus, the pixel data outputs from the sensor array are organized to correspond to the ordered sequence of pixels in the entrance face.

Later, in normal use of the scanner, the linear end is positioned astride a document, a scan line or segment of the document is illuminated, and the address sequence or string, conveniently stored in ROM, is triggered to interrogate the selected sequence of sensor addresses (corresponding to the sequence of pixels in the linear face), to determine the light level associated with each pixel.

The page is then moved, with respect to the linear face, and the process is repeated. In this manner, a page is scanned and the pixel data in the sensor array related to the consecutive scan lines are properly organized even though a noncoherent fiber bundle is used.

U.S. Pat. No. 4,748,680 issued May 31, 1988 and also now assigned to the assignee of the present application discloses a color scanner. The color scanner employs three fiber optic bundles and, in one embodiment, employs dichroic transmission filters (red, green, and blue) on the area faces of the three bundles. The area faces are imaged onto different regions of a single large sensor array associated with different colors or they are imaged onto three different sensor arrays. This technique is relatively expensive because it requires three fiber bundles and three sensor arrays or a single large sensor array.

An alternative technique requires time sequential color illumination with a monochrome sensor array. But this technique requires three times as long for scanning a line, and three light sources, or a white light source and a color wheel.

The problem to which the present invention is directed is to produce a color scanner which utilizes a monochrome sensor array without the expense of three fiber optic bundles or the time consuming time sequential operation and three illumination TM sources. The invention is based on the recognition that so long as each fiber end in the area face of the fiber optic bundle corresponds to a plurality of sensors of the photosensor array, three sensors can be selected to correspond to each fiber end and those sensors can be color coded as well as placed in the proper sequence as noted above.

The color coding is introduced by placing a filter with a repetitive pattern of vertical red, green, and blue (or yellow, cyan and magenta) stripes of such dimensions that at least four stripes correspond to the image of the fiber end on the sensor the filter. A second lens is used to focus the image from the filter (now color coded) onto the photosensor array.

BRIEF DESCRIPTION OF AN ILLUSTRATIVE EMBODIMENT OF THE INVENTION

DETAILED DESCRIPTION OF AN ILLUSTRATIVE EMBODIMENT OF THE INVENTION

Figure 1:
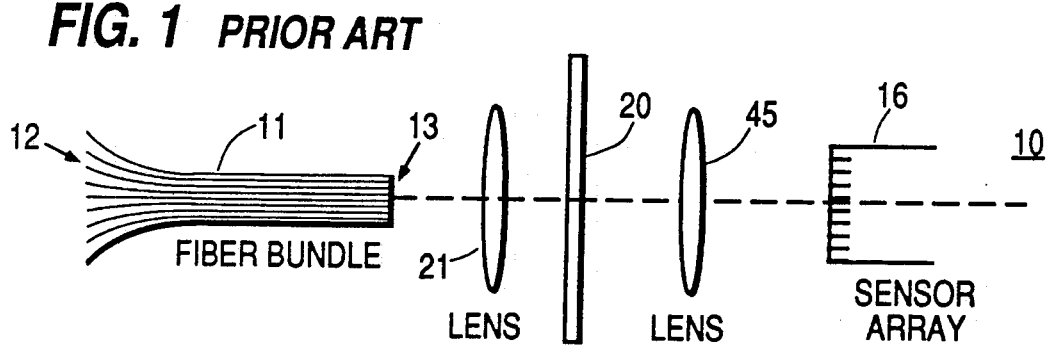
FIGS. 1 and 5 are schematic respresentations of a scanner in accordance with the principle of this invention.

FIG. 1 shows a scanner 10 of the type disclosed in the above-noted U.S. Pat. No. 4,674,834. The scanner includes a fiber optic bundle 11 having a linear face 12 and an area face 13. Bundle 11, illustratively is noncoherent although the same principle would apply to a coherent bundle as is clear from a reading of U.S. Pat. No. 4,762,391 issued Aug. 9, 1988.

Light entering linear face 12 exits area face 13 and is imaged onto a photosensor array 16. Photosensor array 16 preferably is organized on a random access basis. Alternatively a charge coupled device (CCD) which is a sequentially-accessed device coupled to a buffer memory can be used. It is slower than the random access device.

In accordance with the principles of the present invention, sensor array 16 has a relatively large number of sensors for each fiber end in area face 13 of bundle 11. This is consistent with the teachings of the above-noted patents. The sensor array may have, for example, 64,000 to 250,000 sensors and more whereas, the area face of bundle 11 will have, for example, 5100 fiber ends (600 dpi for an 8½ inch page) occupying the same area. The arrangement provides for at least 10 to 20 sensors for each fiber end.

Figure 2:
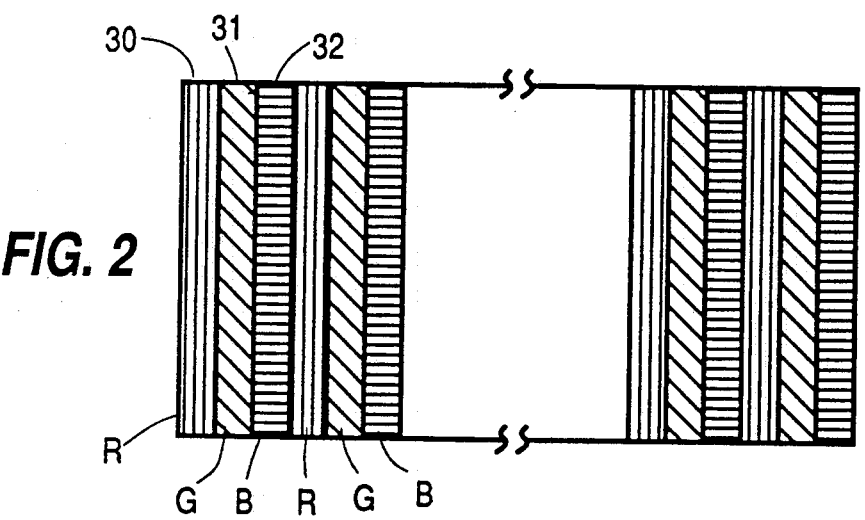
FIG. 2 is a schematic representation of a portion of a filter useful in the scanner of FIG. 1.

Area face 13 and sensor array 16 are spaced apart from one another as shown in the figure. Filter 20 is positioned between face 13 and the sensor array. Filter 20 comprises a glass plate on which consecutive triads of red, green, blue (RGB) transmitting filters are deposited. The filters are in the form of columns of equal width, and equally spaced (center to center). FIG. 2 shows a portion of filter 20 in which R, G, and B stripes are designated 30, 31, and 32.

Figure 3:
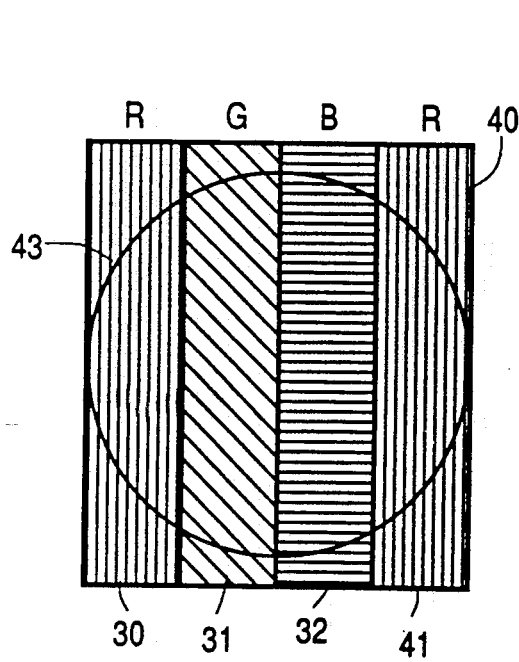
FIG. 3 is an enlarged view of a portion of the filter of FIG. 2 showing a fiber end superimposed on it.

A first lens 21 is positioned between area face 13 and filter 20 to magnify the image of the fiber ends onto filter 20. FIG. 3 shows, enlarged, a portion 40 of filter 20 showing columns 30, 31, and 32 of FIG. 2 along with a next occurring column 41. The figure also shows a representative fiber end 43 of area face 13 imaged onto the filter by lens 21. Ideally, the image of the fiber encompasses at least four columns in order to ensure that at least three adjacent columns of filter 20 are illuminated.

A second lens 45 of FIG. 1 is operative to focus a demagnified image of the columns of filter 20 onto sensor array 16. The magnification and positioning is adjusted so as to have each column of the filter centered and aligned with each column of sensors in the sensor array. This may be accomplished automatically by techniques well understood by those skilled in the art. Thus, lenses 21 and 45 are operative to impose images of the area face of the fiber optic bundle and the colored columns of filter 20 (color modulated) onto the columns of sensors of sensor array 16.

Figure 4:
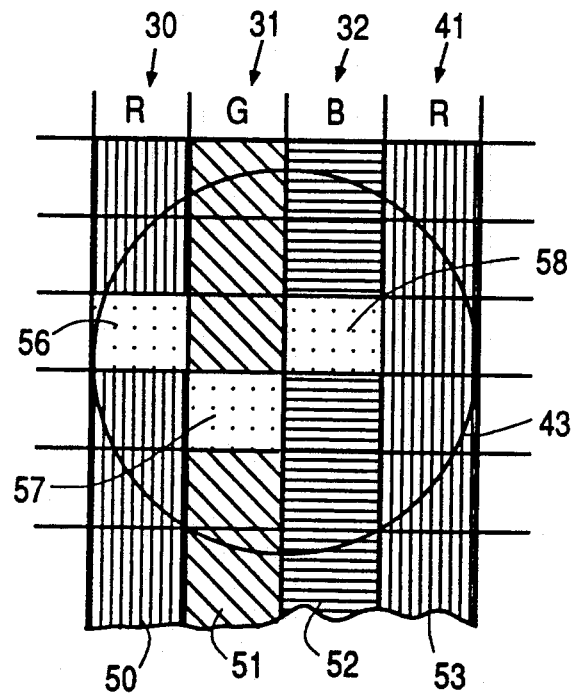
FIG. 4 is an enlarged view of a portion of a sensor array of FIGS. 1 and 5 showing a fiber end and a color filter superimposed on it.

FIG. 4 shows columns (or rows) 50, 51, 52, and 53 of photo sensor array corresponding to column 30, 31, 32 and 41 of filter 20 of FIGS. 1 and 2. The image of representative fiber end 43 of FIG. 3 is also shown in FIG. 4. Each block of FIG. 4 represents a sensor of array 16. Thus, as can be seen from the figure, there are sixteen sensors which clearly correspond to the image of the fiber end. Sensors 56, 57, and 58 may be selected to correspond to RGB colors for the representative fiber. Each fiber is likewise associated with three sensors of the sensor array, thus providing color coding with a single monochrome photosensor array without time sequential color illumination.

Figure 5:
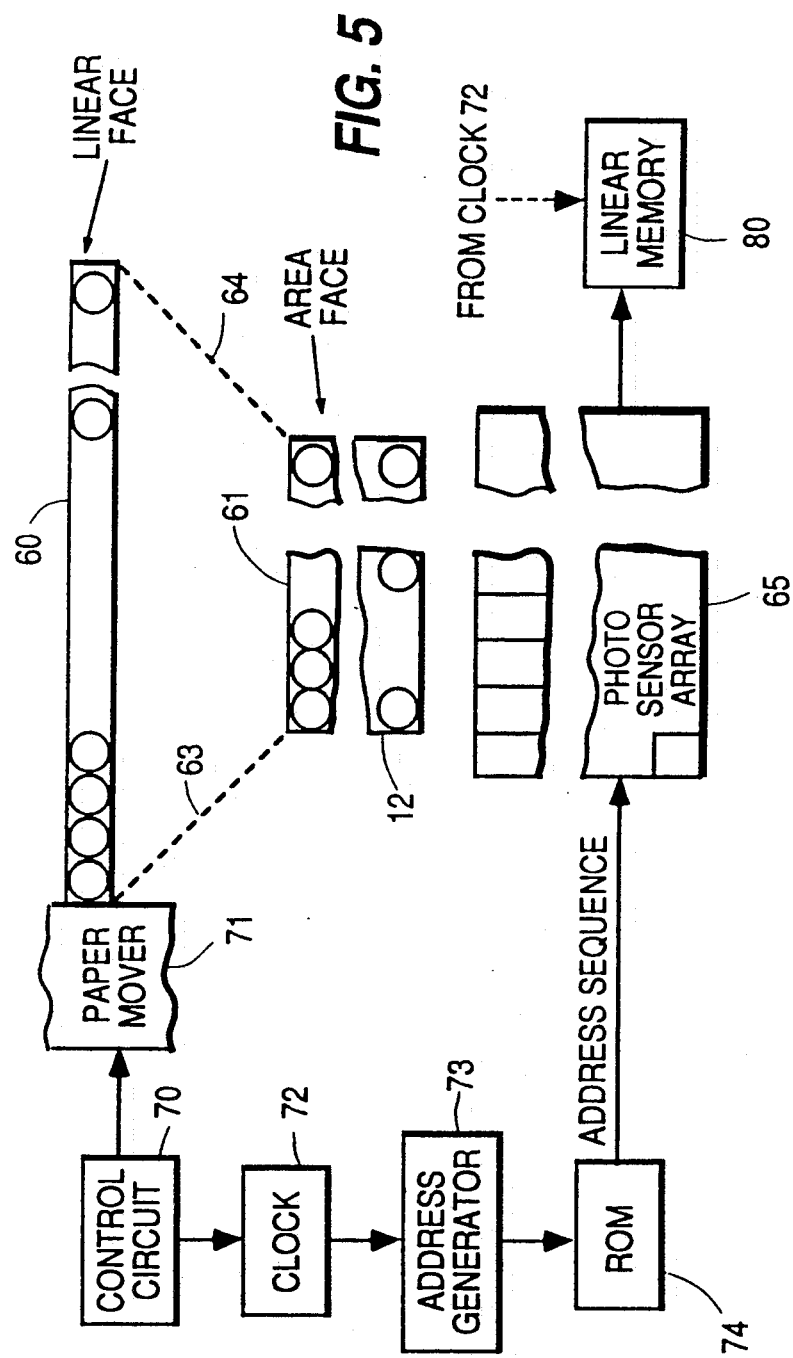

FIG. 5 shows the electronic organization of the scanner of FIG. 1. The fiber optic bundle 11 of FIG. 1 has its linear face represented by broken rectangle 60 and its area face represented by broken rectangle 61. The fiber ends are represented by undesignated circles within each broken rectangle. The envelope of the fiber bundle is represented by broken lines 63 and 64.

The image of area face 61 is directed at photosensor array 65. Lenses 21 and 45 along with filter 20, as shown in FIG. 1, are positioned between area face 61 and sensor array 65. The lenses and filter are omitted from FIG. 5 for clarity. Control circuit 70 is connected to a paper mover 71 and to clock 72. Clock 72 is connected to an address generator 73 and address generator 73 is connected to Read Only Memory (ROM) 74. The address sequence determined during a prior initialization procedure, is stored in ROM in a sequence of (ROM) addresses starting at a "start of sequence" address determined by address generator 73 as is fully described in the above-noted U.S. Pat. No. 4,674,834.

In accordance with the principles of the present invention, the addresses of three sensors are stored in ROM 74 rather than the address of a single sensor for each fiber end in area face 61.

The color information can be read out in a variety of ways. One way is "time sequential" color in which all the red, then all the green, and finally all the blue are read out in sequence. Another way is to read red, green, and blue for each pixel in sequence.

Once pixel data is stored in linear memory 80, the control circuit activates paper mover 71 to move a page (not shown) to the next scan segment and causes the scan segment to be illuminated (by means not shown). The illumination means comprises a source of continuous or pulsed white light. Pulsing the light source allows continuous paper movement and is important for any photosensor array not incorporating electronic shuttering if smearing of the image is to be avoided.

The use of a magnifying lens (21 of FIG. 1) to form a large image of the area face 13 on filter 20 allows the filter to be made by shadow mask techniques. For example, for a fiber array with 3400 fibers (400 dpi), the array is approximately 59×59 fibers and the fiber diameter is 2.5 mils. Accordingly, the overall width is 147.5 mils. Without magnification, the image of each fiber covers four columns of the filter, each column being 0.625 mils wide. With a linear magnification of four, the columns can be 2.5 mils in width. With a magnification of ten, the columns can be 6.25 mils in width and the filter itself is 1.475 inches wide overall. Shadow masking techniques, common in semiconductor processing, can be used to fabricate the filters by evaporation. Alternatively, etching techniques can be used with thin film layers on glass. Magnification permits the filters to be made easily and reliably.

In order to maintain low costs, the filter should not be made too large. A reasonable magnification is about 5 and the use of a double lens approach allows considerable latitude in the choice of magnification.

The initialization procedure for relating the output of the sensor array to the pixel sequence at the entrance face of the fiber optic bundle in a color scanner of the type disclosed herein is different from that used to obtain the proper address sequence of the sensors in a monochrome scanner. In the case where several sensors of the array correspond to a single fiber end in the exit plane of the fiber optic bundle as here disc addresses of each of those sensors along with the associated color is provided.

Figure 6:
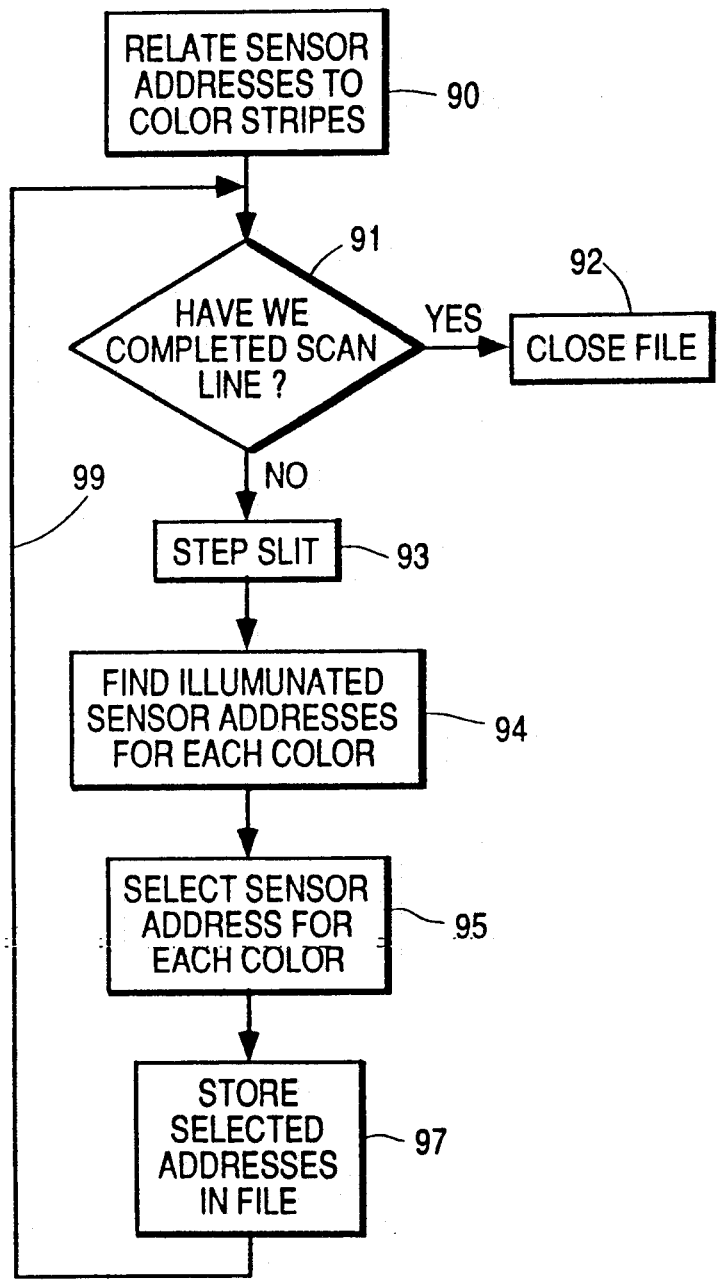
FIG. 6 shows a flow diagram of an illustrative initialization procedure for the scanner of FIGS. 1 and 5.

A flow diagram for obtaining those addresses is shown in FIG. 6. Block 90 in FIG. 6 indicates that the sensors in the sensor array are associated with first, second and third colors which relate them illustratively in columns to match the columns of the color filter. Block 91 indicates that if the initializing slit has been moved across the entire entrance face, the procedure is completed and the file is closed as indicated by block 92.

If initialization of the entire scan line (entrance face) is not complete, the slit is incremented (a distance small compared to the fiber diameter) to a next position as indicated by block 93. The sensor array is interrogated to determine the addresses of all illuminated sensors for the instant slit position as indicated by block 94.

The address of a sensor associated with each color is selected for each slit position as indicated by block 95. The addresses so selected are stored in a file as indicated in block 97. The procedure continues as indicated by arrow 99. When the scan segment is completed in this manner, the file is closed and the file (lookup table) is used to burn, for example, a programmable read only memory (PROM) which then becomes part of the finished color scanner. The PROM or ROM is designated 74 in FIG. 5.

An initialization procedure utilizing a slit typically involves incremental movement of the slit small distances compared to a fiber diameter. Therefore, the procedure results in the selection of sensor addresses for each of a number of slit positions greater than the number of fibers. This number is reduced to one for each of the relevant fiber positions by a procedure which accepts only (for example, analog) sensors which exhibits the largest signal response.

What is claimed is:

1. A color image scanner including a plurality of light pipes for transmitting an image from an entrance face to an exit face, an array of photosensors coupled to said exit face and including at least first, second, and third sensors for each fiber end in said exit face, a filter positioned between said exit face and said sensor array, said filter including a repetitive pattern of first, second, and third color areas corresponding to said first, second, and third sensors for each of said fiber ends.

2. A color scanner in accordance with claim 1 wherein said light pipes comprise a fiber optic bundle and said entrance face is linear and adapted for positioning astride a page to be scanned.

3. A color scanner in accordance with claim 2 wherein said exit face is two-dimensional to define a first area and said sensor array has a second area adapted to capture the entire image of said first area.

4. A color scanner in accordance with claim 3 wherein said repetitive pattern comprises red, green and blue columns, and said sensors of said sensor array are organized in columns and are aligned with said columns of said filter.

5. A color scanner in accordance with claim 3 wherein said first, second, and third sensors for each of said fiber ends in said exit face occupy positions in columns of said array corresponding to respective red, green and blue columns of said filter.

6. A color scanner in accordance with claim 5 also including a first lens between said exit face and said filter for magnifying the image of said exit face onto said filter.

7. A color scanner in accordance with claim 6 also including a second lens for reducing the image of said exit face and said filter onto said sensor array.

8. A color scanner in accordance with claim 7 wherein said column of said filter and the columns of sensors in said sensor array are aligned.

9. A color scanner in accordance with claim 8 also including means for storing the addresses of said first, second, and third sensors for each of said fiber ends in said exit face in a sequence corresponding to the sequence of pixels in said entrance face.

10. A scanner for scanning color images such as are formed on a document, said scanner comprising a plurality of conduits of optical energy, said conduits, having first and second ends organized in a linear geometry and an area geometry at first and second faces respectively, said scanner also including an array of photosensors organized also in an area geometry and positioned such that an image of said second ends in said second face is formed thereon, said array including a subset of at least first, first, second, and third sensors for each of said second ends, each of said sensors having an address, filter means for relating first, second, and third colors with each of said first, second, and third sensors for each of said second ends, means for storing the addresses of a subset of said first sensors, said second and said third sensors such that the addresses therein are ordered in a sequence to correspond to the sequence of pixels in said linear end.

11. A scanner in accordance with claim 10 wherein said plurality of conduits comprises a fiber optic bundle.

12. A scanner in accordance with claim 11 wherein said means for relating comprises a filter having first second and third color stripes thereon, said filter being positioned between said second face and said array.

13. A scanner in accordance with claim 12 also including first and second lenses positioned between said second face and said filter and between said filter and said array, said lenses being operative to magnify the image of said second face onto said filter and to reduce said image onto said array respectively 14. A scanner in accordance with claim 13 wherein said sensor array is organized on a random access basis, said scanner including a read only memory for storing the addresses of each of said subsets in a sequence which corresponds to the order of pixels in said linear face.

15. A scanner in accordance with claim 9 also including means for moving an object to said entrance face, means for exposing said object to white light and means for triggering said address sequence for organizing color pixel data from said sensor array to correspond to the sequence of pixels in said entrance face.

16. A method for determining the positional correspondence between pixels entering the ends of fibers in a fiber optic bundle entrance face and an array of photosensors which includes a number of sensors large compared to the number of fibers and is optically coupled to the exit face of said bundle via a filter having a repetitive pattern of first, second, and third colors on it, said method comprising the steps of providing a color indication for each sensor of said array, said indication associating the sensor address with that of one of said colors, and determining a set of first, second, and third sensors for each fiber in said exit face in a sequence corresponding to that in which pixels enter the entrance face of said bundle.

17. A method in accordance with claim 16 in which said array is a monochrome sensor array and said filter includes like first, second, and third color columns and said step of determining comprises moving a slit to each of consecutive incremental positions in said entrance face, illuminating said entrance face with white light containing each of said first, second, and third colors, interrogating said sensor array to obtain the sensor addresses of illuminated sensors for each slit position, and selecting for each slit position addresses associated with said first, second and third colors.

18. A method in accordance with claim 17 in which said first, second, and third color columns are red, green, and blue respectively.

* * * * *